United States Patent
Agon

(10) Patent No.: US 10,084,632 B2
(45) Date of Patent: Sep. 25, 2018

(54) SYSTEM AND METHOD FOR PEAK-TO-AVERAGE POWER RATIO REDUCTION OF OFDM SIGNALS VIA WEIGHTED GRADIENT-BASED ADAPTIVE PEAK CANCELLATION

(71) Applicant: Apple Inc., Cupertino, CA (US)

(72) Inventor: Zohar Agon, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/645,187

(22) Filed: Jul. 10, 2017

(65) Prior Publication Data

US 2018/0083820 A1    Mar. 22, 2018

Related U.S. Application Data

(60) Provisional application No. 62/398,287, filed on Sep. 22, 2016.

(51) Int. Cl.
| | |
|---|---|
| H04K 1/10 | (2006.01) |
| H04L 27/28 | (2006.01) |
| H04L 27/26 | (2006.01) |
| H04L 12/26 | (2006.01) |

(52) U.S. Cl.
CPC ...... H04L 27/2623 (2013.01); H04L 43/0847 (2013.01)

(58) Field of Classification Search
CPC ............ H04L 27/2601; H04L 27/2602; H04L 27/2647
See application file for complete search history.

(56) References Cited

U.S. PATENT DOCUMENTS

2009/0285194 A1* 11/2009 Kim .................. H03F 1/3247
                                                           370/342
2016/0043889 A1*  2/2016 Lozhkin .......... H04L 27/2623
                                                           375/295
(Continued)

OTHER PUBLICATIONS

Aggarwal, A. et al. "Computing the Optimal Amount of Constellation Distortion in OFDM Systems", *Proc. of IEEE ICC*, 2007, pp. 2918-2923.
(Continued)

*Primary Examiner* — Shuwang Liu
*Assistant Examiner* — Gina McKie
(74) *Attorney, Agent, or Firm* — Sterne, Kessler, Goldstein & Fox P.L.L.C.

(57) ABSTRACT

Embodiments include a system, method, and computer program product that receives an Orthogonal Frequency Division Multiplexing (OFDM) symbol, and utilizes a weighted gradient-based adaptive peak cancellation convergence algorithm to create a peak cancellation signal to reduce a peak-to-average power ratio (PAPR) as well as induced error rates of the OFDM symbol. Iterations of the weighted gradient-based adaptive peak cancellation convergence algorithm produce a peak cancellation signal that converges to a desired peak cancellation signal that satisfies a targeted PAPR. Some embodiments utilize a priori knowledge of a power spectral density of clipping noise and pre-defined transmission constraints in the frequency domain to create a peak cancellation signal with specific and desired spectral density properties. For example, some peak reduction tones (PRTs) may be scaled to take advantage of available power resources associated with the pre-defined transmission constraints, where the scaling is specific to each PRT.

20 Claims, 9 Drawing Sheets

(56) References Cited

U.S. PATENT DOCUMENTS

2016/0212002 A1* 7/2016 Xiong .................... H04L 5/001
2016/0365996 A1* 12/2016 Oh ........................ H04L 5/001

OTHER PUBLICATIONS

Brandwood, D.H., "A complex gradient operator and its application in adaptive array theory", *IEE Proceedings Pts. F and H (Microwaves, Optics, and Antennas)*, vol. 130, No. 1, Feb. 1983, pp. 11-16.

Devlin, C.A. et al., "Gaussian Pulse Based Tone Reservation for Reducing PAPR of OFDM Signals", *Proc. IEEE 65th Vehicular Technology Conference*, 2007, pp. 3096-3100.

Devlin, C.A. et al., "Peak to Average Power Ratio Reduction Technique for OFDM Using Pilot Tones and Unused Carriers", *Proc. IEEE Radio and Wireless Symposium*, 2008, pp. 33-36.

Gatherer, A. and Polley, M., "Controlling Clipping Probability in DMT Transmission", *Proc. 31st Asimolar Conference on Signals, Systems, and Computers*, Nov. 1999, pp. 1076-1079.

Rahmatallah, Y. and Mohan, S., "Peak-To-Average Power Ratio Reduction in OFDM Systems: A Survey and Taxonomy", *IEEE Communications Surveys & Tutorials*, vol. 15, No. 4, Fourth Quarter 2013, pp. 1567-1592.

Tellado, J. and Cioffi, J.M., "Peak Power Reduction for Multicarrier Transmission", *Proc. IEEE Global Communications Conference*, Nov. 1998, 6 pages.

Wang, L. and Tellambura, C., "Analysis of Clipping Noise and Tone Reservation Algorithms for Peak Reduction in OFDM Systems", *IEEE Transactions on Vehicular Technology*, vol. 57, No. 3, May 2008, pp. 1675-1694.

* cited by examiner

SYSTEM AND METHOD FOR PEAK-TO-AVERAGE POWER RATIO REDUCTION OF OFDM SIGNALS VIA WEIGHTED GRADIENT-BASED ADAPTIVE PEAK CANCELLATION

CROSS-REFERENCE TO RELATED APPLICATION

This application claims priority to U.S. Provisional Patent Application No. 62/398,287, filed on Sep. 22, 2016, entitled System and Method for Peak-to-Average Power Ratio Reduction of OFDM Signals via Weighted Gradient-Based Adaptive Peak Cancellation, which is incorporated herein by reference in its entirety.

BACKGROUND

Field

The described embodiments generally relate to techniques for transmitters employed to translate information into electro-magnetic waves.

Related Art

Orthogonal Frequency Division Multiplexing (OFDM) is a digital transmission technique where a given channel bandwidth is divided into subchannels and individual digital signaling tones are transmitted over each subchannel concurrently in time. The transmitted tones together may have a large peak-to-average power ratio (PAPR) in the time-domain, which requires linear and thus lower efficiency amplifiers to be used.

SUMMARY

The described embodiments include a method, computer program product, and system for utilizing a weighted gradient-based adaptive peak cancellation convergence algorithm to create a peak cancellation signal to reduce a peak-to-average power ratio (PAPR) as well as induced error rates of an Orthogonal Frequency Division Multiplexing (OFDM) symbol. Iterations of the weighted gradient-based adaptive peak cancellation convergence algorithm produce a peak cancellation signal that converges to a desired peak cancellation signal that satisfies a targeted PAPR. Some embodiments utilize a priori knowledge of a power spectral density of clipping noise and pre-defined transmission constraints in the frequency domain to create a peak cancellation signal with specific and desired spectral density properties. For example, some peak reduction tones (PRTs) may be scaled to take advantage of available power resources associated with the pre-defined transmission constraints where the scaling is specific to each PRT. In some embodiments, the scaled values of the PRTs are constrained to limiting values, and the scaled values are saved after an iteration. The saved scaled values may be used to ensure that after an iteration, the power of a PRT does not exceed a maximum power value. Some embodiments utilize directional constraints on data-carrying PRTs to achieve a target PAPR with minimum induced packet error rate (PER) or bit error rate (BER) degradation.

Some embodiments include receiving an OFDM symbol, determining a clipping noise sample of the OFDM symbol, and determining a peak cancellation signal that includes one or more weighted PRTs. Each PRT of the one or more PRTs may be based at least in part on a power spectral density of the clipping noise sample and a power-limitation specific to each PRT, wherein the peak cancellation signal is used to reduce a peak-to-average power ratio (PAPR) of the OFDM symbol. Each iteration of the weighted gradient-based adaptive peak cancellation algorithm determines a peak cancellation signal that may be used to determine the next peak cancellation signal.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
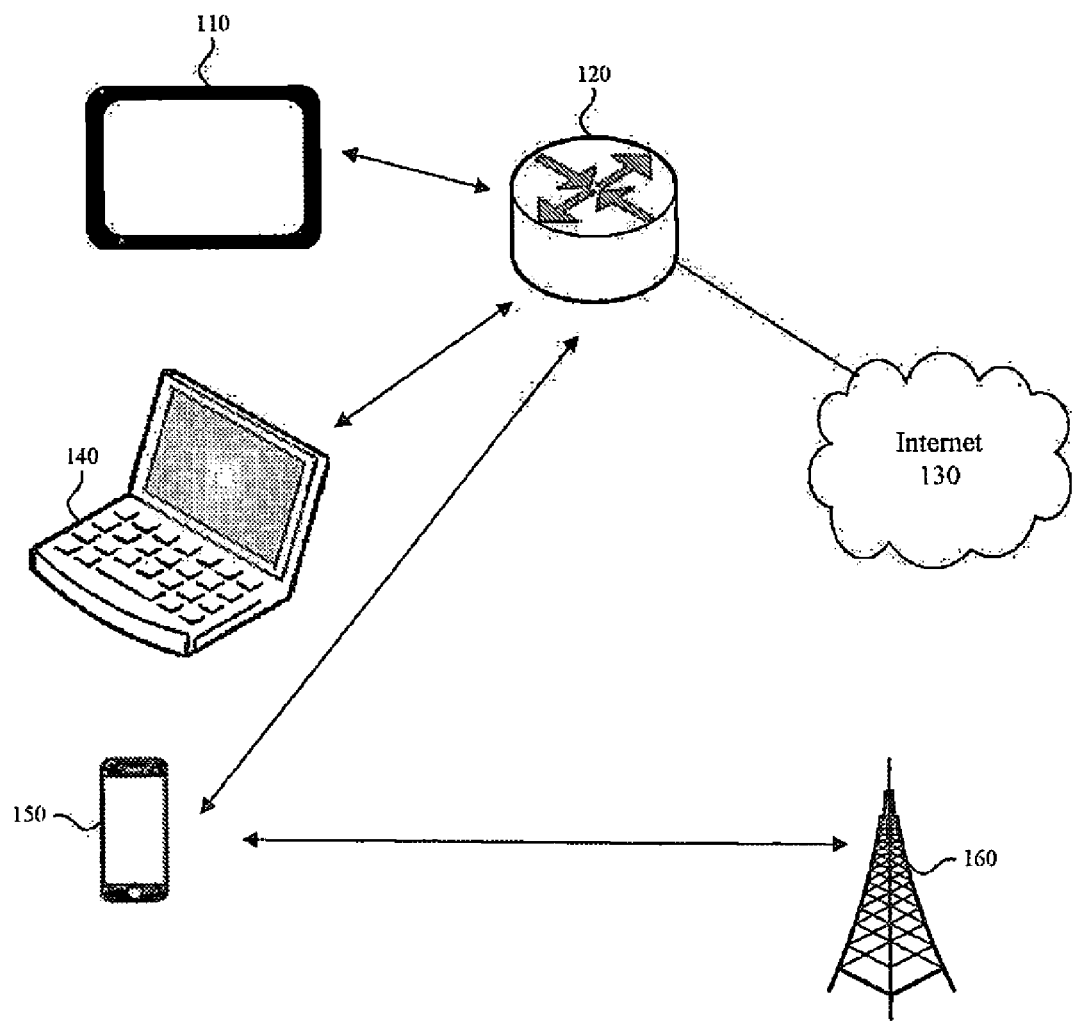
FIG. 1 illustrates an example system implementing weighted gradient-based adaptive peak cancellation, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A disadvantage of the Orthogonal Frequency Division Multiplexing (OFDM) transmission scheme mentioned earlier, is that the time-domain waveform may have a large peak-to-average power ratio (PAPR) which requires linear and consequently, inefficient amplifiers. Some embodiments utilize a weighted gradient-based adaptive peak cancellation convergence algorithm to create a peak cancellation signal to reduce a PAPR as well as induced error rates of an OFDM symbol. Each iteration of the weighted gradient-based adaptive peak cancellation convergence algorithm produces a peak cancellation signal that converges to a desired peak cancellation signal that satisfies a targeted PAPR. Some embodiments utilize a priori knowledge of a power spectral density of clipping noise and pre-defined transmission constraints in the frequency domain to create a peak cancellation signal with peak reduction tones (PRTs) that are scaled according to specific and desired spectral density properties. In some embodiments, an individual PRT may be scaled according to limitations specific to that PRT. This is in contrast to conventional PAPR reduction techniques.

FIG. 1 illustrates an example system 100 implementing weighted gradient-based adaptive peak cancellation, according to some embodiments of the disclosure. Example system 100 is provided for the purpose of illustration only and is not limiting of embodiments. System 100 may include wireless, mobile wireless and wireline devices with transmitters supporting Orthogonal Frequency Division Multiplexing (OFDM) including but not limited to devices designed in accordance with 4th Generation Cellular long term evolution (LTE), 3rd Generation cellular mobile technology (e.g., UMTS/EDGE/CDMA2000), wireless local area networks (WiFi), broadband fixed wireless access networks (Wi-MAX), mobile broadband Wireless networks (mobile WiMAX), asynchronous digital subscriber lines (ADSL, VDSL), digital video broadcasting-terrestrial (DVB-T) and its extension DVB Handheld (DVB-H), ultra Wideband (UWB), and alternating current (AC) power lines. The example of system 100 includes a tablet 110, laptop 140, smart phone 150, router 120, Internet 130, and base station 160. It is to be appreciated that system 100 may include other electronic devices in addition to or in place of the electronic devices illustrated in FIG. 1 without departing from the scope and spirit of this disclosure.

Figure 2:
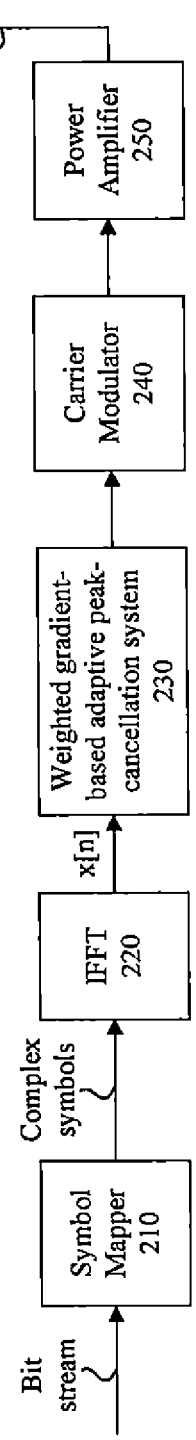
FIG. 2 is a block diagram that illustrates an example system implementing weighted gradient-based adaptive peak cancellation, according to some embodiments of the disclosure.

FIG. 2 is a block diagram that illustrates an example system 200 implementing weighted gradient-based adaptive peak cancellation, according to some embodiments of the disclosure. Example system 200 is provided for the purpose of illustration only and is not limiting of embodiments. As a convenience and not a limitation, system 200 is described with respect to elements of FIG. 1. System 200 may be a transmitter in a device of FIG. 1. System 200 includes symbol mapper 210, inverse fast Fourier transform (IFFT 220), weighted gradient-based adaptive peak cancellation system 230, carrier modulator 240, power amplifier 250, and antenna 260.

Symbol mapper 210 receives a bit stream which is mapped to complex symbols according to a modulation scheme. The complex symbols are provided to IFFT 220 which maps the complex symbols to respective subcarriers before transforming the mapped subcarriers into a time domain signal x[n]. The time domain signal comprises OFDM symbols and each OFDM symbol includes $N_{FFT}$ samples. An OFDM symbol x[n] is received by weighted gradient-based adaptive peak cancellation system 230 that utilizes a weighted gradient-based convergence algorithm to shape and constrain peak reduction tones (PRTs) based at least in part on a clipping noise sample and power limitations to reduce the PAPR as well as to reduce induced error rates. The output of weighted gradient-based adaptive peak cancellation system 230 may attain a targeted PAPR and is sent to carrier modulator 240 for modulation. The modulated signal is sent to power amplifier 250 where it is amplified and coupled to antenna 260 for transmission to a receiver. The reduction of the PAPR reduces the back-offs experienced by power amplifier 250, for example, and thus improves the efficiency of power amplifier 250.

Figure 3:
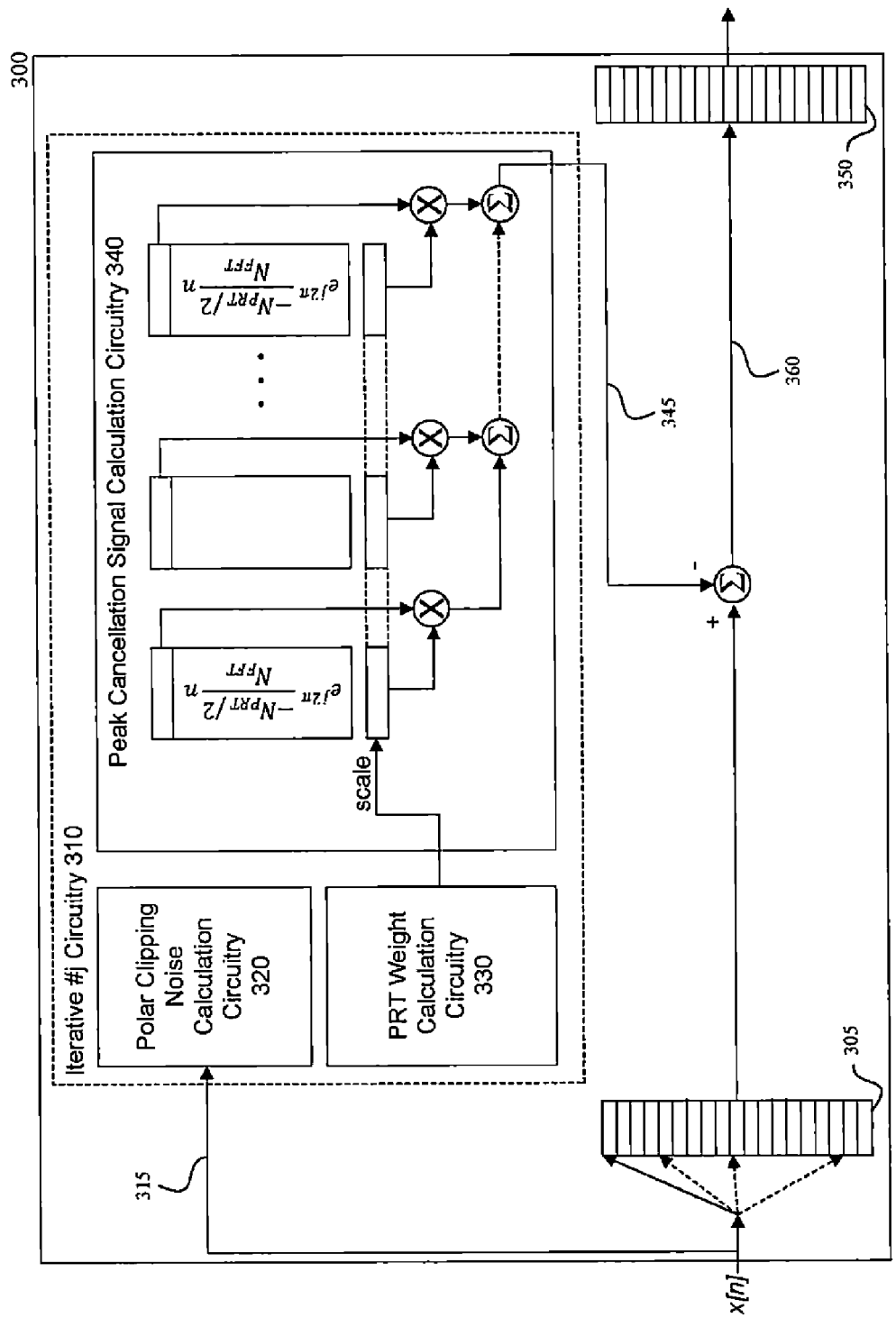
FIG. 3 is a block diagram that illustrates an example weighted gradient-based adaptive peak cancellation system, according to some embodiments of the disclosure.

FIG. 3 is a block diagram that illustrates an example weighted gradient-based adaptive peak cancellation system 300, according to some embodiments of the disclosure. Example system 300 is provided for the purpose of illustration only and is not limiting of embodiments. As a convenience and not a limitation, system 300 may be described with respect to elements of FIG. 2. System 300 may be an embodiment of weighted gradient-based adaptive peak cancellation system 230 of FIG. 2, that utilizes a weighted gradient-based convergence algorithm to shape and constrain PRTs to reduce PAPR as well as to reduce induced error rates.

System 300 includes buffer 305, buffer 350, and iterative circuitry 310. Iterative circuitry 310 includes polar clipping noise calculation circuitry 320, PRT weight calculation circuitry 330, and peak cancellation signal calculation circuitry 340. The output of iterative circuitry 310 is peak cancellation signal 345, $\underline{c}^{(j+1)}$. Output symbol 360 of system 300 is the sum of the input OFDM symbol x[n] 315 and peak cancellation signal 345, $\underline{c}^{(j+1)}$.

System 300 receives OFDM symbol x[n] 315, which includes N FFT samples. The N

FFT samples of OFDM symbol x[n] 315 may be stored in buffer 305 while an iteration of the weighted gradient-based adaptive peak cancellation algorithm is performed by iterative circuitry 310 for the N FFT samples of OFDM symbol x[n] 315. Polar clipping noise calculation circuitry 320 analyzes the N FFT samples to determine which samples exceed a settable clipping level threshold. Polar clipping noise calculation circuitry 320 detects samples whose amplitudes exceed the settable clipping level threshold and employs polar clipping to obtain clipping noise samples.

PRT weight calculation circuitry 330 uses at least one of the following to determine weights for select PRTs that are then used to scale PRTs to determine peak cancellation signal 345: the power spectral density (PSD) of a clipping noise sample and power-related limitations. Power-related limitations include but are not limited to: in-band (IB) power constraint (e.g., an error vector magnitude (EVM) of OFDM symbol x[n] 315); out-of-band (OOB) power constraint (e.g., spectral mask, out-of-band emissions); power violations (e.g., IB or OOB limitations that are exceeded); and available power resources (e.g., IB or OOB limitations that are not met). Available power resources may be determined from a clipping noise sample at a bin frequency k whose PSD is below an IB limitation and/or an OOB limitation. The available power resource(s) may indicate a capacity for additional weighting of $PRT_k$ of select PRTs used to create peak cancellation signal 345. IB and/or OOB power violations at a bin frequency k may indicate that a weight for $PRT_k$ may be reduced. IB and/or OOB power limitations or variations thereof (e.g., a maximum value of 110% of an average EVM) may be used to limit a weight of $PRT_k$ based on the location of the bin frequency k. Thus, a weight determined for $PRT_k$ may be specific to that PRT at bin frequency k.

Peak cancellation signal calculation circuitry 340 uses the weights determined by PRT weight calculation circuitry 330 to determine peak cancellation signal 345, $\underline{c}^{(j+1)}$, which may be stored and used in the next iteration. The output OFDM symbol 360 is the sum of the input OFDM symbol x[n] 315 and the peak cancellation signal 345, $\underline{c}^{(j+1)}$. Output OFDM symbol 360 may be stored in buffer 350. The output OFDM symbol 360 has a lower PAPR that is closer to a target PAPR than input OFDM symbol x[n] 315. A next iteration for a next OFDM symbol x[n+1] by iterative circuitry 310 utilizes the saved previous peak cancellation signal 345 resulting in the next output OFDM symbol x[n+1] having a PAPR that is lower and closer to the target PAPR than the previous output OFDM symbol 360.

Figure 4:
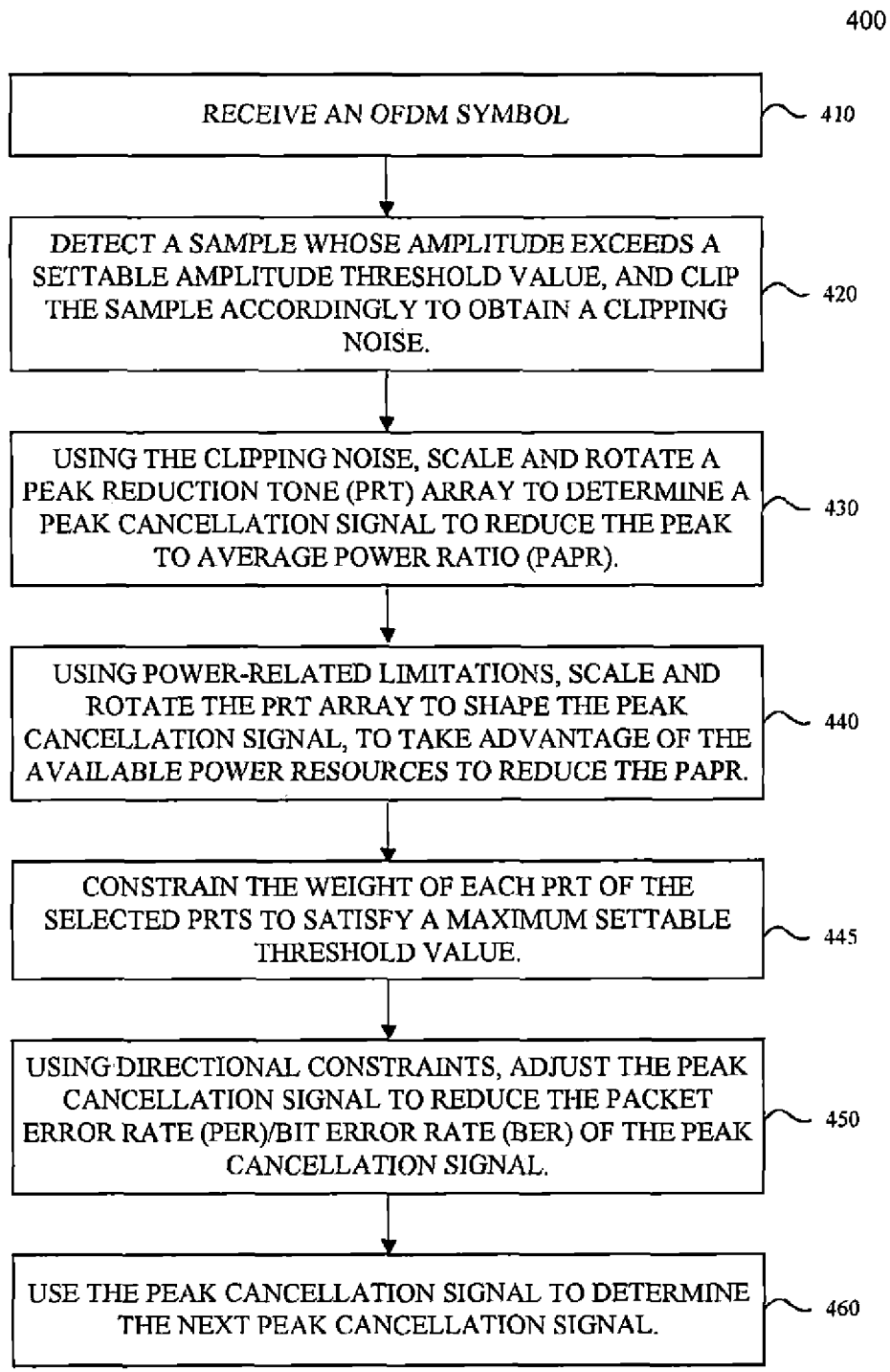
FIG. 4 illustrates an example process for weighted gradient-based adaptive peak cancellation, according to some embodiments of the disclosure.

FIG. 4 illustrates an example process 400 for weighted gradient-based adaptive peak cancellation, according to some embodiments of the disclosure. Example process 400 is provided for the purpose of illustration only and is not limiting of embodiments. As a convenience and not a limitation, process 400 may be described with respect to elements of FIGS. 2-11. Process 400 may be performed by one or more components of system 200. It is to be appreciated that not all steps may be needed to perform the disclosure provided herein. Further, some of the steps may be performed simultaneously, or in a different order than shown in FIG. 4, as will be understood by a person of ordinary skill in the art.

As an example and not a limitation, process 400 may be illustrated using an 802.11n modulation and coding scheme (MCS) 3 OFDM symbol, at back-off (BO) of 12 dB, sampled at 80 MHz, and a target PAPR of 3.7 dB (e.g., reduction of the PAPR to 3.7 dB).

PAPR is defined as:

$$PAPR(x[n]) = \max_{0 \leq n \leq N-1} \frac{|x[n]|^2}{E(|x[n]|^2)}$$

where x[n] is an OFDM symbol, E{ } is the expectation operator, and BO is defined as:

$$BO = -db10(E\{|x[n]|^2\})$$

At 410, process 400 may receive an OFDM symbol. For example, OFDM symbol x[n] 315 may be received from IFFT 220 of FIG. 2.

Figure 5:
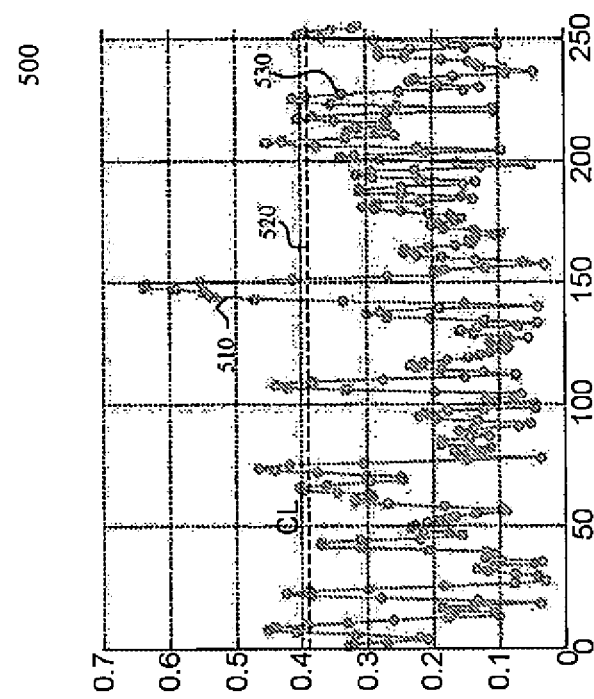
FIG. 5 illustrates an example graph of an Orthogonal Frequency Division Multiplexing (OFDM) symbol, according to some embodiments of the disclosure.

At 420, process 400 may detect a sample of the OFDM symbol whose amplitude exceeds a settable amplitude threshold value, and clip the sample to obtain a clipping noise. FIG. 5 illustrates an example graph 500 of an OFDM symbol, according to some embodiments of the disclosure. Example graph 500 is provided for the purpose of illustration only and is not limiting of embodiments. Graph 500 illustrates amplitudes of samples of OFDM symbol 510 and clipping level (CL) 520. OFDM symbol 510 includes N samples, one of which is shown as sample 530. To achieve a target PAPR, the amplitudes of the samples of OFDM symbol 510 should satisfy CL 520, a settable amplitude threshold value. For example, to satisfy CL 520, the amplitude of a sample of OFDM symbol 510 may be less than or equal to a value of CL 520.

A sample of the OFDM symbol whose amplitude exceeds the settable amplitude threshold value (e.g., exceeds CL 520) may be detected and clipped to obtain a clipping noise sample of the OFDM symbol as depicted in FIG. 5. The clipping noise sample is based on the difference between the sample amplitude and the settable amplitude threshold value. The samples above the dashed line CL 520 may be clipped to determine clipped noise samples.

Figure 6:
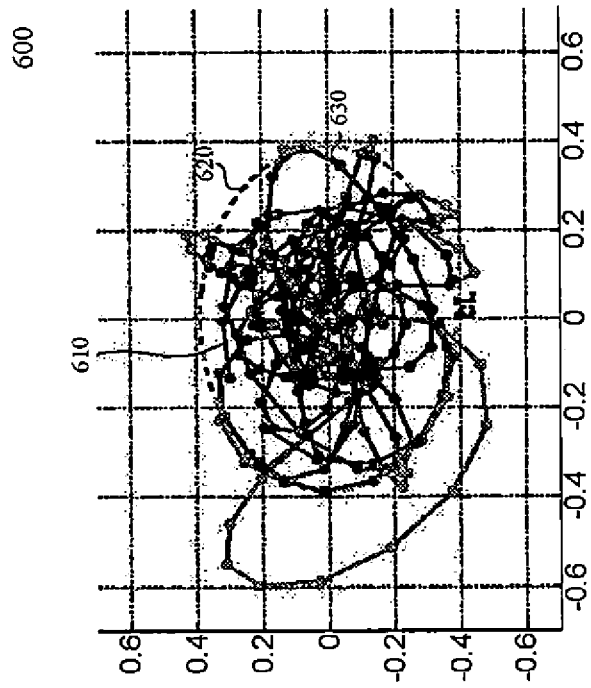
FIG. 6 illustrates an example of a polar clipping graph, according to some embodiments of the disclosure.

FIG. 6 illustrates an example of a polar clipping graph 600, according to some embodiments of the disclosure. Example graph 600 is provided for the purpose of illustration only and is not limiting of embodiments. Graph 600 illustrates OFDM symbol 610, and a CL 620. OFDM symbol 610 includes n samples, one of which is shown as sample 630. OFDM symbol 610 may correlate to OFDM symbol 510 of FIG. 5, where the samples that exceed the settable amplitude threshold value (e.g., exceed CL 620) are shown as being outside the dashed line of CL 620. Clipping noise samples are generated from these samples. The samples of OFDM symbol 610 within CL 620 are within acceptable boundaries.

Polar Clipping (PC) may confine an OFDM symbol's samples inside the shape of CL 620 by the following operation:

$$PC(x[n]) = \begin{cases} x[n], & \text{if } |x[n]| \leq CL \\ CL \cdot e^{j \angle x[n]}, & \text{if } |x[n]| > CL \end{cases}$$

where n indicates a sample and j indicates an iteration.

The clipping noise may be expressed as the following:

$$ClippingNoise(x[n]) = x[n] - PC(x[n]) = \begin{cases} 0, & \text{if } |x[n]| \leq CL \\ x[n] - CL \cdot e^{j \angle x[n]}, & \text{if } |x[n]| > CL \end{cases}$$

Figure 7:
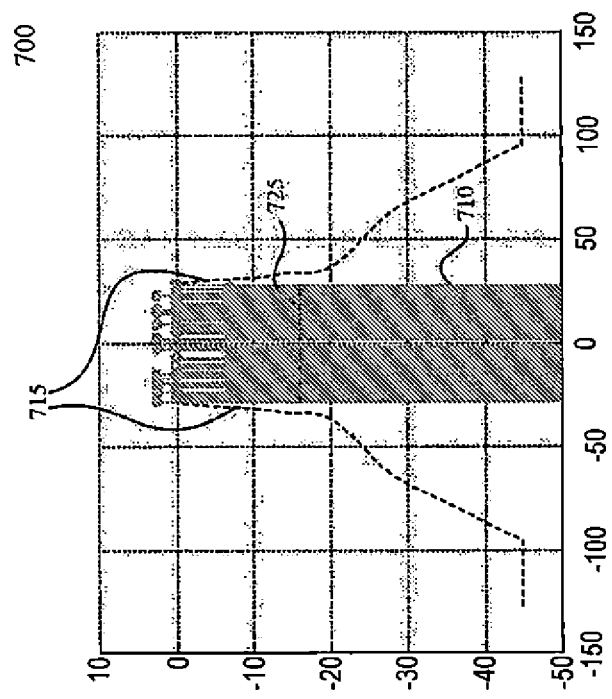
FIG. 7 illustrates an example of a power spectral density (PSD) graph of an OFDM symbol with in-band and out-of-band constraints, according to some embodiments of the disclosure.

FIG. 7 illustrates an example of a power spectral density (PSD) graph 700 of an OFDM symbol with in-band and OOB constraints, according to some embodiments of the disclosure. Example graph 700 is provided for the purpose of illustration only and is not limiting of embodiments. For example, graph 700 illustrates Power Spectral Density (PSD) 710 of OFDM symbol 510 together with IB power constraint 725 and OOB power constraint 715.

Figure 8:
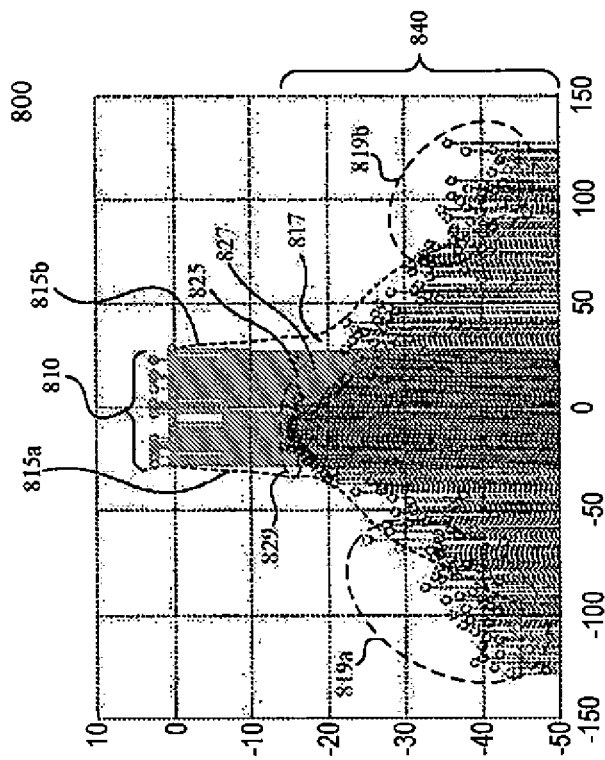
FIG. 8 illustrates an example of a PSD graph 800 of clipping noise, power constraint, available power resources, and power violations, according to some embodiments of the disclosure.

FIG. 8 illustrates an example of a PSD graph 800 of clipping noise, power constraint, available power resources, and power violations, according to some embodiments of the disclosure. Example graph 800 is provided for the purpose of illustration only and is not limiting of embodiments. For example, graph 800 illustrates PSD 810 together with TB power constraint 825 and OOB power constraints 815a and 815b, which may correspond to PSD 710, IB power constraint 725, and OOB power constraints 715 of FIG. 7. PSD 840 represents the PSD of the clipping noise samples of FIG. 6 that are outside the boundaries of CL 620. The clipping noise samples may be used to scale and rotate designated PRTs to determine a peak cancellation signal that may be subtracted from the OFDM symbol 510 to reduce the PAPR.

OOB power violations 819a and 819b indicate areas where PSD 840 exceeds OOB power constraints 815a and 815b. OOB available power resource 817 indicates where PSD 840 does not take advantage of the capacity of OOB power constraints 815b (and 815a although not shown), namely that the unused capacity indicates available power resources. Similarly, IB power violation 829 indicates an area where PSD 840 exceeds IB power constraint 825. IB available power resource 827 indicates where PSD 840 does not take advantage of the capacity of IB power constraint 825. Thus, the unused capacity indicates another available power resource.

Some embodiments take advantage of the available power resources above by weighting PRTs at the data-carrying subcarrier bins and adjacent subcarrier bins that have unused power resources with a clipping noise to increase the peak cancellation signal that may be subtracted from the OFDM symbol and reduce the PAPR. For example, the peak cancellation signal may be scaled with weights that utilize available power associated with a PRT. Using power constraints of a PRT, some embodiments scale and rotate the PRT array to further shape the peak cancellation signal to increase PSD 840 at certain PRTs to take advantage of the power constraints available (e.g., unexploited OOB resource 817 and/or unexploited IB resource 827) to reduce the PAPR. Further, some embodiments constrain or reduce the power at certain PRTs at a specific frequency (or bin number, k) to reduce PSD 840 not to exceed a maximum value based on the power limitations (e.g., OOB power constraints 815 and/or 1B power constraint 825). Thus, the weight of each PRT may be specific to each PRT. For example, the location of one PRT may be IB and have one weight value that may be different than a second weight value of a second PRT that may be OOB. In another example, IB PRTs may have different weight values based at least on the PSD of their respective clipping noise samples, power constraints, and/or available power resources.

Returning to FIG. 4, at 430, process 400 may use the clipping noise to scale and rotate a PRT array to determine a peak cancellation signal to reduce the PAPR. In the example, PSD 840 represents the PSD of the clipping noise samples of FIG. 6 that are outside the boundaries of CL 620.

At 440, process 400 may use power-related limitations to scale and rotate the PRT array to shape the peak cancellation signal to take advantage of the available power resources to reduce the PAPR. In the example, the peak cancellation signal may be scaled with weights that utilize available power resources associated with a PRT. A PRT may be cyclic shifted to the occurrence of a clipping noise sample and then weighted according to the power spectral density of the clipped noise and power-related limitations (e.g., transmission limitations) to determine a peak cancellation signal that increases the convergence rate of the weighted gradient-based convergence algorithm. A transmission limitation may include an IB constraint (e.g., IB EVM symbol power limitation), and/or an OOB channel bandwidth power limit (e.g., spectral mask, OOB emission). In some embodiments, a PRT of the peak cancellation signal may take advantage of available power resources associated with the transmission limitations (e.g., unexploited OOB resource and/or unexploited IB resource) to reduce the PAPR.

In a weighted gradient-based adaptive peak cancellation algorithm, a peak cancellation signal is updated in each iteration by the following adaptation equation:

$$\underline{c}^{(j+1)} = \underline{c}^{(j)} - \mu \cdot F_N^{-1} \cdot W \cdot W^\dagger \cdot F_{N'} \alpha^{(j)}$$

where:
$\alpha^{(j)}$—is the Polar Clipping noise of iteration (j)
$F_N$—is the DFT matrix
W—is a matrix of PRT weights:

$$(W)_{n,k} = \begin{cases} w_{n_{PRT}} & n = k = n_{PRT} \\ 0 & \text{otherwise} \end{cases}$$

μ—is the adaptation coefficient

The weights matrix not only projects the clipping noise onto designated PRTs, but also utilizes each subcarrier effectively under IB and/or OOB constraints (e.g., IB EVM symbol power limits and/or OOB channel bandwidth power limits). As a result, the resulting peak cancellation signal converges to a peak cancellation signal that may satisfy a target PAPR. For example, each OFDM sample that is clipped adds an additional instance of an exponent (e.g., cyclically-shifted to the clip occurrence), scaled by the clipping noise, a PRT-specific weight, and an adaptation coefficient.

In some embodiments, the adaptation coefficient μ may be a constant or adapted after each iteration. A constant adaptation coefficient μ may be selected such that the total energy of the weighted and constrained clipping noise can be equaled to the energy of the original clipping noise for an iteration. In another example, an adapted adaptation coefficient μ may be selected to equal the difference between the amplitude of the highest peak clipping samples of the clipping noise prior to an iteration, and that of a respective amplitude of the weighted and constrained clipping noise after the iteration. The adaptation coefficient μ may be adjusted after each iteration. An Inverse Goertzel algorithm may be used to find the clipping noise after the shaping (e.g., weighting and constraining) at specific clipping point samples (and prior the IFFT).

Figure 9:
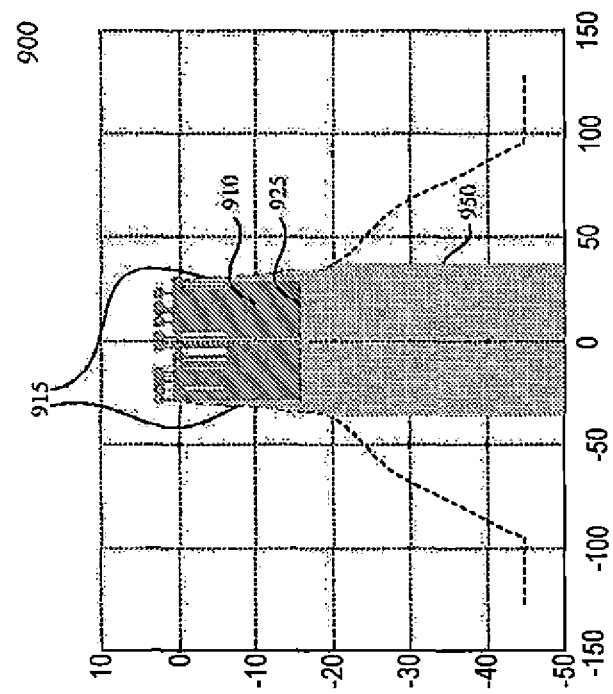
FIG. 9 illustrates an example of a PSD graph of a selected set of peak reduction tones and their limits, according to some embodiments of the disclosure.

In some embodiments a selected PRT may be rotated and scaled based at least on a corresponding clipping noise sample, power constraint, power violation, and/or available power resource. FIG. 9 illustrates an example PSD graph 900 of a selected set of peak reduction tones and their limits, according to some embodiments of the disclosure. Example graph 900 is provided for the purpose of illustration only and is not limiting of embodiments. For example, graph 900 illustrates PSD 910 of OFDM symbol 510, together with IB power constraint 925, and OOB power constraints 915 which may correlate to PSD 710, IB power constraint 725, and OOB power constraints 715 of FIG. 7. The PRTs that are selected and weighted based on the weighted gradient-based adaptive peak cancellation algorithm are shown as selected PRTs 950. Note that selected PRTs 950 include PRTs of data-carrying subcarriers and the OOB subcarriers with the highest available power (e.g., the OOB subcarriers closest to the data-carrying subcarriers). Thus, by weighting selected PRTs 950, the clipping noise power may be increased or decreased accordingly to take advantage of the available (e.g., unused) IB and/or OOB power resources and also satisfy the IB and OOB power constraints. The weighted selected PRTs 950 may be used to determine a peak cancellation signal that is subtracted from OFDM symbol 510 to obtain a PAPR reduction (e.g., satisfy a PAPR target). In an example, a PAPR may be reduced by 3.3 dB in a single iteration.

Figure 10:
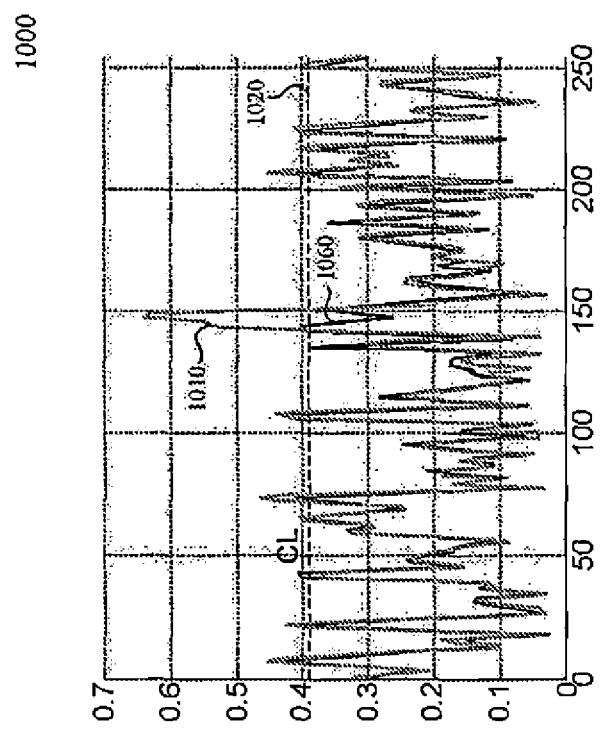
FIG. 10 illustrates an example graph of an OFDM symbol prior and post a single iteration, according to some embodiments of the disclosure.

FIG. 10 illustrates an example graph 1000 of an OFDM symbol prior and post a single iteration, according to some embodiments of the disclosure. Example graph 1000 is provided for the purpose of illustration only and is not limiting of embodiments. Graph 1000 includes OFDM symbol 1010 and CL 1020 which may correlate to OFDM symbol 510 and CL 520 of FIG. 5 prior to applying peak cancellation according to some embodiments. OFDM symbol 1060 represents OFDM symbol 510 after a single iteration of the weighted gradient-based adaptive peak cancellation algorithm according to some embodiments of the disclosure. Note that the highest noise peaks of OFDM symbol 510 have been reduced significantly after a single iteration. In an example, input OFDM symbol x[n] 315 of FIG. 3 correlates to symbol 1010 of FIG. 10 that has a high PAPR, and output OFDM symbol 360 correlates to symbol 1060 that has a lower PAPR after a single iteration of iterative circuitry 310.

Returning to FIG. 4, at 445, process 400 may constrain the weight of each PRT of the selected PRTs to satisfy a maximum settable threshold value. Some embodiments of the disclosure constrain the weight, $\beta_k^{(j)}$, of $PRT_k$, to satisfy a maximum settable threshold value, $L_k$, based on IB and out-of band power constraints, where k is a subcarrier of selected PRTs 950, and j is a number of the iteration of the weighted gradient-based adaptive peak cancellation algorithm. To satisfy may mean that the weight, $\beta_k^{(j)}$, is less than a maximum settable threshold value, $L_k$. For example, the weight, $\beta_7^{(1)}$, of a $PRT_7$ of selected PRTs 950 that shapes and constrains $PRT_7$ in a first iteration (e.g., j=1) may be analyzed to determine whether the maximum settable threshold value, $L_7$, is satisfied. If the maximum settable threshold value, $L_7$, is not satisfied (e.g., the weight, $\beta_7^{(1)}$, is larger than $L_7$), then the weight, $\beta_7^{(1)}$, is reduced to an acceptable value. The weight, $13_7^{(1)}$, that satisfies $L_7$ is then is saved. In the next iteration (e.g., j=2) of the weighted gradient-based adaptive peak cancellation algorithm, the next weight, $\beta_7^{(2)}$, of $PRT_7$ is summed with the saved previous weight, $\beta_7^{(1)}$, and the sum is analyzed to determine whether the sum satisfies the maximum settable threshold value, $L_7$, and so on. Thus, after each iteration, some embodiments safeguard that the power of the each $PRT_k$ of selected PRTs 950 does not violate their respective maximum settable threshold value, $L_k$.

At 450, process 400 may constrain the weight of each PRT of the selected PRTs to satisfy a maximum settable value. Some embodiments of the disclosure apply directional constraints to adjust the peak cancellation signal to reduce the packet error rate (PER) and/or bit error rate (BER). Instead of using the same power constraint on all the PRTs located on data-carrying subcarriers, some embodiments utilize directional constraints on the PRTs and/or utilize PRTs for which the reduction of the PAPR does not bring the data-carrying subcarrier's constellation point any closer to other constellation points. For example, some PRTs of selected PRTs 950 that are located on data-carrying subcarriers, the weighted gradient-based adaptive peak cancellation algorithm may utilize directional constraints on those PRTs and/or utilize PRTs for which the reduction of the PAPR does not bring the data-carrying subcarrier's constellation point any closer to other constellation points. By using directional constraints the algorithm may reach the target PAPR under IB and OOB power constraints (e.g., EVM and Spectral Mask constraints including available power resources) with lower PER and/or lower BER.

Figure 11:
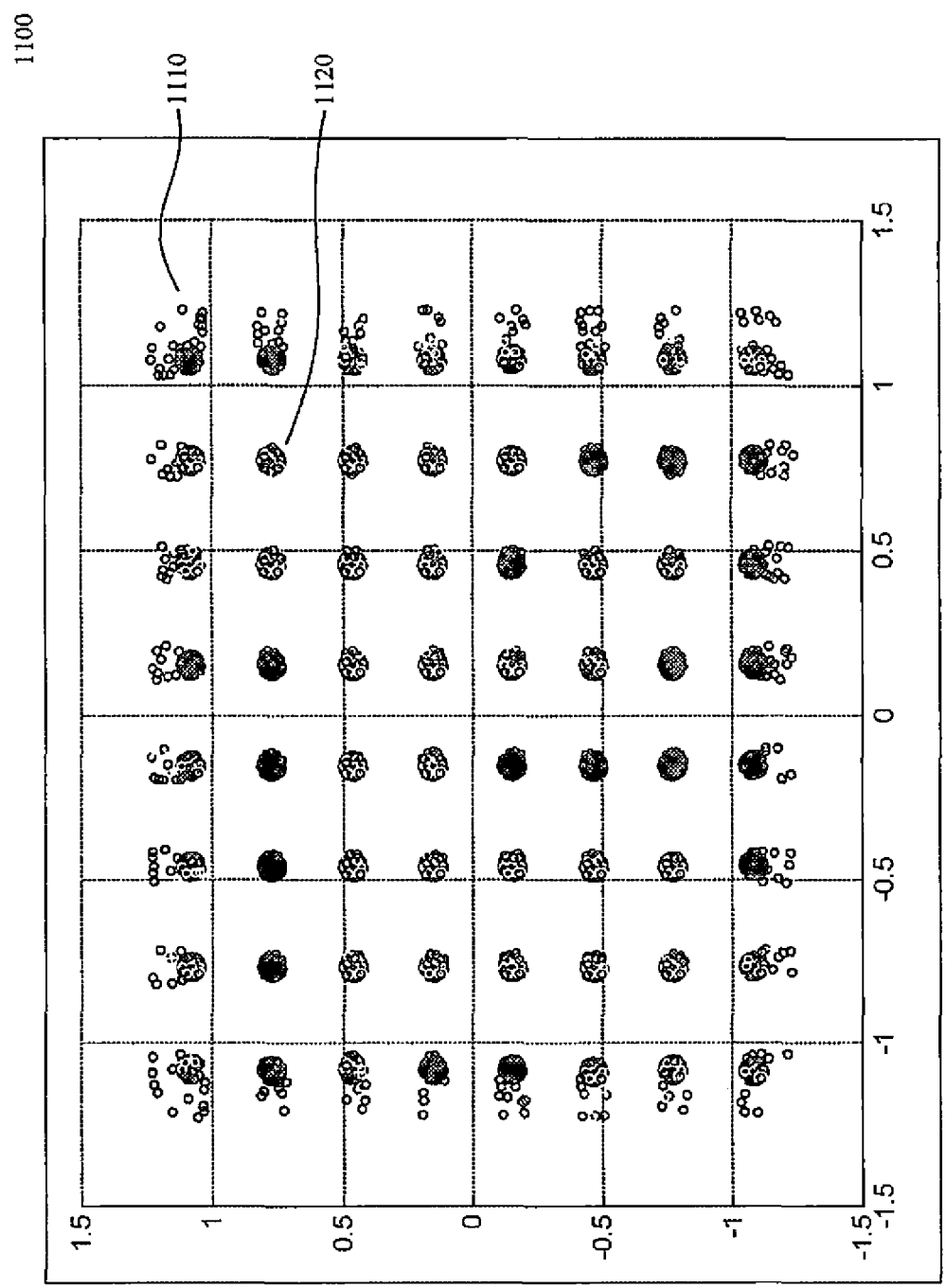
FIG. 11 illustrates an example diagram of an error rate reduction, according to some embodiments of the disclosure.

FIG. 11 illustrates an example diagram 1100 of an error rate reduction, according to some embodiments of the disclosure. Example diagram 1100 is provided for the purpose of illustration only and is not limiting of embodiments. Diagram 1100 illustrates data-carrying constellation points of symbols in a packet plotted on a complex plane (e.g., data-carrying constellation points transmitted for MCS7 at 6 db BO). The symbols on the circumference of the constellation may utilize directional constraints in the weight gradient-based adaptive peak cancellation algorithm to reach the PAPR under the IB and OOB power constraints with a lower PER and/or BER. Thus, for symbol 1110, a $PRT_k$ of selected PRTs 950 located at the data-carrying subcarriers, weight, $\beta_k^{(j)}$, may include one or more elements whose phase is in a direction of the allowed scatter points shown. For example, a receiver receiving the constellations including symbol 1110 with any of the potential outward directional constraints (e.g., shown as scatter points) applied, would receive and recognize PRT 1110. In addition, some embodiments may apply directional constraints to data-carrying subcarrier PRTs of symbol 1120 for which the reduction of the PAPR does not bring symbol 1120 any closer to other constellation points.

Example Mathematical Description

This section provides a mathematical description of some embodiments. For example, the mathematical description may describe the features of interactive circuitry 310 of FIG. 3 to determine a peak cancellation signal 345, $\underline{C}^{(j+1)}$.

For each OFDM symbol an existence of a vector C*, which is:
a weight vector of Reserved OFDM subcarriers or Peak Reduction Tones (PRTs), the solution to the minimization of the clipping noise energy problem:

$\varepsilon(\underline{C}) \triangleq \|x + F_N^{-1} \cdot W \cdot \underline{C} - \text{clip}_A(x + F_N^{-1} \cdot W \cdot \underline{C})\|^2$ where $\underline{x}$ is symbols' samples, $F_N$ is the N-DFT matrix and W converts the $N_{PRT}$x1 vector to $N_{FFT}$x1 vector giving each of the PRTs a different weight—a Gradient-based Iterative Algorithm is applied:

$$\underline{C}^{(j+1)} = \underline{C}^{(j)} - \mu \cdot (\nabla_C \varepsilon(\underline{C}))|_{c=c^{(j)}}$$

or after applying IDFT matrix multiplied by W, in the time domain:

$$\underline{c}^{(j+1)} = \underline{c}^{(j)} - \mu \cdot F_N^{-1} \cdot W \cdot (\nabla_c \varepsilon(\underline{C}))|_{c=c^{(j)}}$$

For example, for $N_{PRT}=14$ at locations $\{29{:}35, N_{FFT}\text{-}(29{:}35)\}$ W may be defined:

$$W = \begin{pmatrix} 0 & 0 & 0 & 0 & 0 & 0 & 0 & 0 \\ \vdots & \vdots & \vdots & \vdots & \vdots & \vdots & \vdots & \vdots \\ 0 & 0 & 0 & 0 & 0 & 0 & 0 & 0 \\ \sqrt{w_{29}} & 0 & 0 & 0 & 0 & 0 & 0 & 0 \\ 0 & \sqrt{w_{30}} & 0 & 0 & 0 & 0 & 0 & 0 \\ 0 & 0 & \ddots & 0 & 0 & 0 & 0 & 0 \\ 0 & 0 & 0 & \sqrt{w_{35}} & 0 & 0 & 0 & 0 \\ \vdots & \vdots & \vdots & \vdots & \vdots & \vdots & \vdots & \vdots \\ 0 & 0 & 0 & 0 & 0 & 0 & 0 & 0 \\ 0 & 0 & 0 & 0 & \sqrt{w_{N_{FFT}-35}} & 0 & 0 & 0 \\ 0 & 0 & 0 & 0 & 0 & \ddots & 0 & 0 \\ \vdots & \vdots & \vdots & \vdots & \vdots & \vdots & \sqrt{w_{N_{FFT}-30}} & \vdots \\ 0 & 0 & 0 & 0 & 0 & 0 & 0 & \sqrt{w_{N_{FFT}-29}} \\ 0 & 0 & 0 & 0 & 0 & 0 & 0 & 0 \\ \vdots & \vdots & \vdots & \vdots & \vdots & \vdots & \vdots & \vdots \\ 0 & 0 & 0 & 0 & 0 & 0 & 0 & 0 \end{pmatrix}$$

Bearing in mind that:

$\varepsilon(\underline{C})$—is a constant (zero) for $|x[n]+c[n]| \le A$, such that the gradient is not zero only at the clipping noise samples, $\varepsilon(\underline{C})$—is not an analytic function, and the gradient operator may be appropriate.

$$\nabla_C \|\underline{x} + F_N^{-1} \cdot W \cdot \underline{C} - A \cdot \text{sgn}(\underline{x} + F_N^{-1} \cdot W \cdot \underline{C})\|_2^2 ==$$

$$\nabla_C \begin{pmatrix} ((\underline{x} + F_N^{-1} \cdot W \cdot \underline{C}) - A \cdot \text{sgn}(\underline{x} + F_N^{-1} \cdot W \cdot \underline{C}))^\dagger \cdot \\ ((\underline{x} + F_N^{-1} \cdot W \cdot \underline{C}) - A \cdot \text{sgn}(\underline{x} + F_N^{-1} \cdot W \cdot \underline{C})) \end{pmatrix} ==$$

$$\nabla_C \left( \|\underline{x} + F_N^{-1} \cdot W \cdot \underline{C}\|_2^2 - A\left((\underline{x} + F_N^{-1} \cdot W \cdot \underline{C})^\dagger \text{sgn}(\underline{x} + F_N^{-1} \cdot W \cdot \underline{C}) + \text{sgn}(\underline{x} + F_N^{-1} \cdot W \cdot \underline{C})^\dagger (\underline{x} + F_N^{-1} \cdot W \cdot \underline{C})\right) \right) ==$$

$$\frac{\partial \left( \|\underline{x} + F_N^{-1} \cdot W \cdot \underline{C}\|_2^2 - A\begin{pmatrix} (\underline{x} + F_N^{-1} \cdot W \cdot \underline{C})^\dagger \text{sgn}(\underline{x} + F_N^{-1} \cdot W \cdot \underline{C}) + \\ \text{sgn}(\underline{x} + F_N^{-1} \cdot W \cdot \underline{C})^\dagger (\underline{x} + F_N^{-1} \cdot W \cdot \underline{C}) \end{pmatrix} \right)}{\partial \underline{C}^*}$$

while:

$$\|\underline{x}+F_N^{-1}\cdot W\cdot \underline{C}\|_2^2 + (\underline{x}^\dagger \cdot N_N^{-1} \cdot W) \cdot \underline{C} + \underline{C}^\dagger \cdot (W^\dagger \cdot F_N \cdot \underline{x}) + \underline{C}^\dagger \cdot (W^\dagger \cdot F_N \cdot F_N^{-1} \cdot W) \cdot \underline{C}$$

such that:

$$\frac{\partial (\|\underline{x} + F_N^{-1}\cdot W \cdot \underline{C}\|_2^2)}{\partial \underline{C}^*} = W^\dagger \cdot F_N \cdot \underline{x} + (W^\dagger \cdot F_N \cdot F_N^{-1} \cdot W) \cdot \underline{C}$$

$$\frac{\partial ((\underline{x}+F_N^{-1}\cdot W\cdot \underline{C})^\dagger \cdot \text{sgn}(\underline{x}+F_N^{-1}\cdot W\cdot \underline{C}))}{\partial \underline{C}^*} = W^\dagger \cdot F_N \cdot \text{sign}(\underline{x}+F_N^{-1}\cdot W\cdot \underline{C})$$

and the third element of the numerator derivative can be assumed to be equal to zero, such that:

$$\nabla_C \|\underline{x} + F_N^{-1}\cdot W\cdot \underline{C} - A \cdot \text{sgn}(\underline{x}+F_N^{-1}\cdot W\cdot \underline{C})\|_2^2 =$$

$$W^\dagger \cdot F_N \cdot \underline{x} + (W^\dagger \cdot F_N \cdot F_N^{-1}\cdot W)\cdot \underline{C} - A\cdot W^\dagger \cdot F_N \cdot \text{sign}(\underline{x} + F_N^{-1}\cdot W\cdot \underline{C}) =$$

$$W^\dagger \cdot F_N \cdot (\underline{x} + F_N^{-1}\cdot W\cdot \underline{C} - A\cdot \text{sign}(\underline{x}+F_N^{-1}\cdot W\cdot \underline{C}))$$

And defining a diagonal matrix S:

$$S_{ii} = \begin{cases} 1 & |x[i]+c[i]| > A \\ 0 & |x[i]+c[i]| \le A \end{cases}$$

Thus, $$\underline{C}^{(j+1)} = \underline{C}^{(j)} - \mu \cdot (\nabla_C \varepsilon(\underline{C}))\big|_{\underline{C}=\underline{C}^{(j)}} =$$

$$\underline{C}^{(j)} - \mu \cdot W^\dagger \cdot F_N \cdot S \cdot (\underline{x}+F_N^{-1}\cdot W\cdot \underline{C}^{(j)} - A\cdot \text{sign}(\underline{x}+F_N^{-1}\cdot W\cdot \underline{C}^{(j)}))$$

or in the time-domain:

$$\underline{c}^{(j+1)} = \underline{c}^{(j)} - \mu \cdot F_N^{-1}\cdot W\cdot (\nabla_{\underline{C}} \varepsilon(C))\big|_{\underline{C}=\underline{C}^{(j)}} ==$$

$$\underline{c}^{(j)} - \mu \cdot F_N^{-1}\cdot W\cdot W^\dagger \cdot F_N \cdot S\cdot (\underline{x}+F_N^{-1}\cdot W\cdot \underline{C} - A\cdot \text{sign}(\underline{x}+F_N^{-1}\cdot W\cdot \underline{C}))\big|_{\underline{C}=\underline{C}^{(j)}} = \underline{c}^{(j)} - \mu \cdot F_N^{-1}\cdot W\cdot W^\dagger \cdot F_N \cdot S\cdot (\underline{x}+F_N^{-1}\cdot W\cdot \underline{C}^{(j)} - A\cdot \text{sign}(\underline{x}+F_N^{-1}\cdot W\cdot \underline{C}^{(j)}))$$

such that:

$$\underline{c}^{(j+1)} = \underline{c}^{(j)} - \mu \cdot F_N^{-1}\cdot W\cdot W^\dagger \cdot F_N \cdot \underbrace{S\cdot (\underline{x}+\underline{c}^{(j)} - A\cdot \text{sign}(\underline{x}+\underline{c}^{(j)}))}_{\triangleq \underline{a}^{(j)}}$$

and recognizing that:

$$(W\cdot W^\dagger)_{n,k} = \begin{cases} w_{n_{PRT}} & n=k=n_{PRT} \\ 0 & \text{otherwise} \end{cases}$$

we can deduce that:

$$W\cdot W^\dagger \cdot \underbrace{F_N \cdot S\cdot (\underline{x}+\underline{c}^{(j)} - A\cdot \text{sign}(\underline{x}+\underline{c}^{(j)}))}_{\text{FFT of the clipping noise}}$$

is the projection of the clipping noise in the frequency domain on the PRTs and weighting each one of the PRTs by a weight increases the convergence of the algorithm.

$$\underline{c}^{(j+1)} = \underline{c}^{(j)} - \mu \cdot F_N^{-1} \cdot W \cdot W^\dagger \cdot F_N \cdot \underline{\alpha}^{(j)} = \underline{c}^{(j)} + \mu \cdot F_N^{-1} \cdot \underbrace{W \cdot W^\dagger \cdot F_N \cdot (-\underline{\alpha}^{(j)})}_{\triangleq \underline{\beta}^{(j)}}$$

such that the equation for a peak cancellation signal, $\underline{c}^{(j+1)}$, is shown below:

$$\underline{c}^{(j+1)} = \underline{c}^{(j)} + \mu \cdot F_N^{-1} \cdot \underline{\beta}^{(j)}$$

Looking at a row n of $F_N^{-1} \cdot W \cdot W^\dagger \cdot F_N$:

$$\frac{1}{\sqrt{N_{FFT}}} \left( 1 \quad e^{j2\pi \frac{1}{N_{FFT}} n} \quad e^{j2\pi \frac{2}{N_{FFT}} n} \quad e^{j2\pi \frac{3}{N_{FFT}} n} \quad \ldots \right) \cdot \begin{pmatrix} 0 & 0 & \ldots & 0 & 0 & 0 & 0 & 0 & 0 & \ldots & 0 & 0 & 0 & 0 & 0 & 0 & \ldots & 0 \\ \vdots & \ddots & \vdots & \vdots & \vdots & \vdots & \vdots & 0 & \ldots & \vdots & \vdots & \vdots & \vdots & \vdots & 0 & \ldots & \vdots \\ 0 & 0 & \ldots & 0 & 0 & 0 & 0 & 0 & 0 & \ldots & 0 & 0 & 0 & 0 & 0 & 0 & \ldots & 0 \\ 0 & 0 & \ldots & 0 & w_{29} & 0 & 0 & 0 & 0 & \ldots & 0 & 0 & 0 & 0 & 0 & 0 & \ldots & 0 \\ 0 & 0 & \ldots & 0 & 0 & \ddots & 0 & 0 & 0 & \ldots & 0 & 0 & 0 & 0 & 0 & 0 & \ldots & 0 \\ 0 & 0 & \ldots & 0 & 0 & 0 & w_{35} & 0 & 0 & \ldots & 0 & 0 & 0 & 0 & 0 & 0 & \ldots & 0 \\ 0 & 0 & \ldots & 0 & 0 & 0 & 0 & 0 & 0 & \ldots & 0 & 0 & 0 & 0 & 0 & 0 & \ldots & 0 \\ \vdots & 0 & \ldots & \vdots & \vdots & \vdots & \vdots & \vdots & \ddots & \vdots & \vdots & \vdots & \vdots & \vdots & 0 & \ldots & \vdots \\ 0 & 0 & \ldots & 0 & 0 & 0 & 0 & 0 & 0 & \ldots & 0 & 0 & 0 & 0 & 0 & 0 & \ldots & 0 \\ 0 & 0 & \ldots & 0 & 0 & 0 & 0 & 0 & 0 & \ldots & 0 & w_{N_{FFT}-35} & 0 & 0 & 0 & 0 & \ldots & 0 \\ 0 & 0 & \ldots & 0 & 0 & 0 & 0 & 0 & 0 & \ldots & 0 & 0 & \ddots & 0 & 0 & 0 & \ldots & 0 \\ 0 & 0 & \ldots & 0 & 0 & 0 & 0 & 0 & \ldots & \vdots & \vdots & \vdots & w_{N_{FFT}-29} & \vdots & 0 & \ldots & 0 \\ 0 & 0 & \ldots & 0 & 0 & 0 & 0 & 0 & 0 & \ldots & 0 & 0 & 0 & 0 & 0 & 0 & \ldots & 0 \\ 0 & 0 & \ldots & 0 & 0 & 0 & 0 & 0 & 0 & \ldots & 0 & 0 & 0 & 0 & 0 & 0 & \ldots & 0 \\ \vdots & 0 & \ldots & \vdots & \vdots & \vdots & \vdots & \vdots & 0 & \ldots & \vdots & \vdots & \vdots & \vdots & \vdots & \ddots & \vdots \\ 0 & 0 & \ldots & 0 & 0 & 0 & 0 & 0 & 0 & \ldots & 0 & 0 & 0 & 0 & 0 & 0 & \ldots & 0 \end{pmatrix} \cdot F_N ==$$

$$\frac{1}{\sqrt{N_{FFT}}} \left( 1 \quad e^{j2\pi \frac{1}{N_{FFT}} n} \quad e^{j2\pi \frac{2}{N_{FFT}} n} \quad e^{j2\pi \frac{3}{N_{FFT}} n} \quad \ldots \right) \cdot \begin{pmatrix} 0 & 0 & 0 & & 0 \\ \vdots & \vdots & \vdots & & \vdots \\ w_{29} \cdot e^{-j2\pi \frac{29}{N_{FFT}} 0} & w_{29} \cdot e^{-j2\pi \frac{29}{N_{FFT}} 1} & \vdots & & w_{29} \cdot e^{-j2\pi \frac{29}{N_{FFT}}(N_{FFT}-1)} \\ w_{30} \cdot e^{-j2\pi \frac{30}{N_{FFT}} 0} & w_{30} \cdot e^{-j2\pi \frac{30}{N_{FFT}} 1} & \vdots & & w_{30} \cdot e^{-j2\pi \frac{30}{N_{FFT}}(N_{FFT}-1)} \\ \vdots & \vdots & \vdots & & \vdots \\ \vdots & \vdots & \vdots & & \vdots \\ 0 & 0 & 0 & & 0 \end{pmatrix} =$$

$$\frac{1}{N_{FFT}} \left( \sum_{k \in PRT} w_k \cdot e^{j2\pi \frac{k}{N_{FFT}} n} \cdot e^{-j2\pi \frac{k}{N_{FFT}} 0} \quad \sum_{k \in PRT} w_k \cdot e^{j2\pi \frac{k}{N_{FFT}} n} \cdot e^{-j2\pi \frac{k}{N_{FFT}} 1} \quad \ldots \right)$$

and multiplying this row n by $\underline{\alpha}^{(j)}$, or by $S \cdot (\underline{x} + \underline{c}^{(j)} - A \cdot \text{sign}(\underline{x} + \underline{c}^{(j)}))$, we see that at time sample n the gradient has a contribution from each clipped point i:

$$c_n^{(j+1)} = c_n^{(j)} + \mu \cdot \sum_{k \in PRT} \underbrace{\left( \sum_{i \in (Clipping\ Points)} (-\alpha_i^{(j)}) \cdot w_k \cdot e^{-j2\pi \frac{k}{N_{FFT}} i} \right)}_{\triangleq \beta_k^{(j)}} \cdot e^{j2\pi \frac{k}{N_{FFT}} n}$$

Each of the PRTs is cyclic shifted to the occurrence of the clipping, and then weighted by the clipping noise and the additional weights—$\underline{w}$. The additional weights of the PRTs enable us to use an a-priori knowledge of the clipping noise spectral density and to increase the convergence rate of the algorithm to build a peak cancellation signal with specific and desired Spectral Density properties utilizing the available power resources.

In support of 445 of FIG. 4, and the equation for the peak cancellation signal:

$$\underline{c}^{(j+1)} = \underline{c}^{(j)} + \mu \cdot F_N^{-1} \cdot \underline{\beta}^{(j)}$$

the energy added at a specific frequency k may be limited not to exceed a maximum threshold value, $L_k^2$:

$$\tilde{\beta}_k^{(j)} = \max\{=\beta_k^{(j)}|, L_k\} \cdot \text{sign}(\beta_k^{(j)})$$

In addition, the weight of each one of the PRTs in the previous iteration is saved, and the newly calculated weight of each PRT value is added to the previous iteration(s). The calculation below ensures that after each iteration, the energy of each PRT does not violate a predefined requisite such as spectral mask or EVM:

$$\tilde{\beta}_k^{(j)} = \begin{cases} L_k \cdot \text{sign}\left(\beta_k^{(j)} + \sum_{l=1}^{j-1} \tilde{\beta}_k^{(l)}\right) - \sum_{l=1}^{j-1} \tilde{\beta}_k^{(l)} & \text{for } \left|\beta_k^{(j)} + \sum_{l=1}^{j-1} \tilde{\beta}_k^{(l)}\right| > L_k \\ \beta_k^{(j)} & \text{otherwise} \end{cases}$$

Such that the update formula for Peak Cancellation signal is:

$$\underline{c}^{(j+1)} = \underline{c}^{(j)} + \mu \cdot F_N^{-1} \cdot \underline{\hat{\beta}}^{(j)}$$

In support of 450 of FIG. 4, each PRT is cyclically shifted to the occurrence of a clipping, and then weighted by the clipping noise and additional weights—$\underline{w}$. The contribution to the sample n may be rewritten as:

$$\sum_{k \in PRT} \underbrace{\left( \sum_{i \in (Clipping\ Points)} \alpha_i^{(j)} \cdot w_k \cdot e^{-j2\pi \frac{k}{N_{FFT}} i} \right)}_{\triangleq \beta_k^{(j)}} \cdot e^{j2\pi \frac{k}{N_{FFT}} n}$$

$$\underline{c}^{(j+1)} = \underline{c}^{(j)} - \mu \cdot F_N^{-1} \cdot W \cdot W^\dagger \cdot F_N \cdot S \cdot \underline{\alpha}^{(j)}$$

Example Computer System

Figure 12:
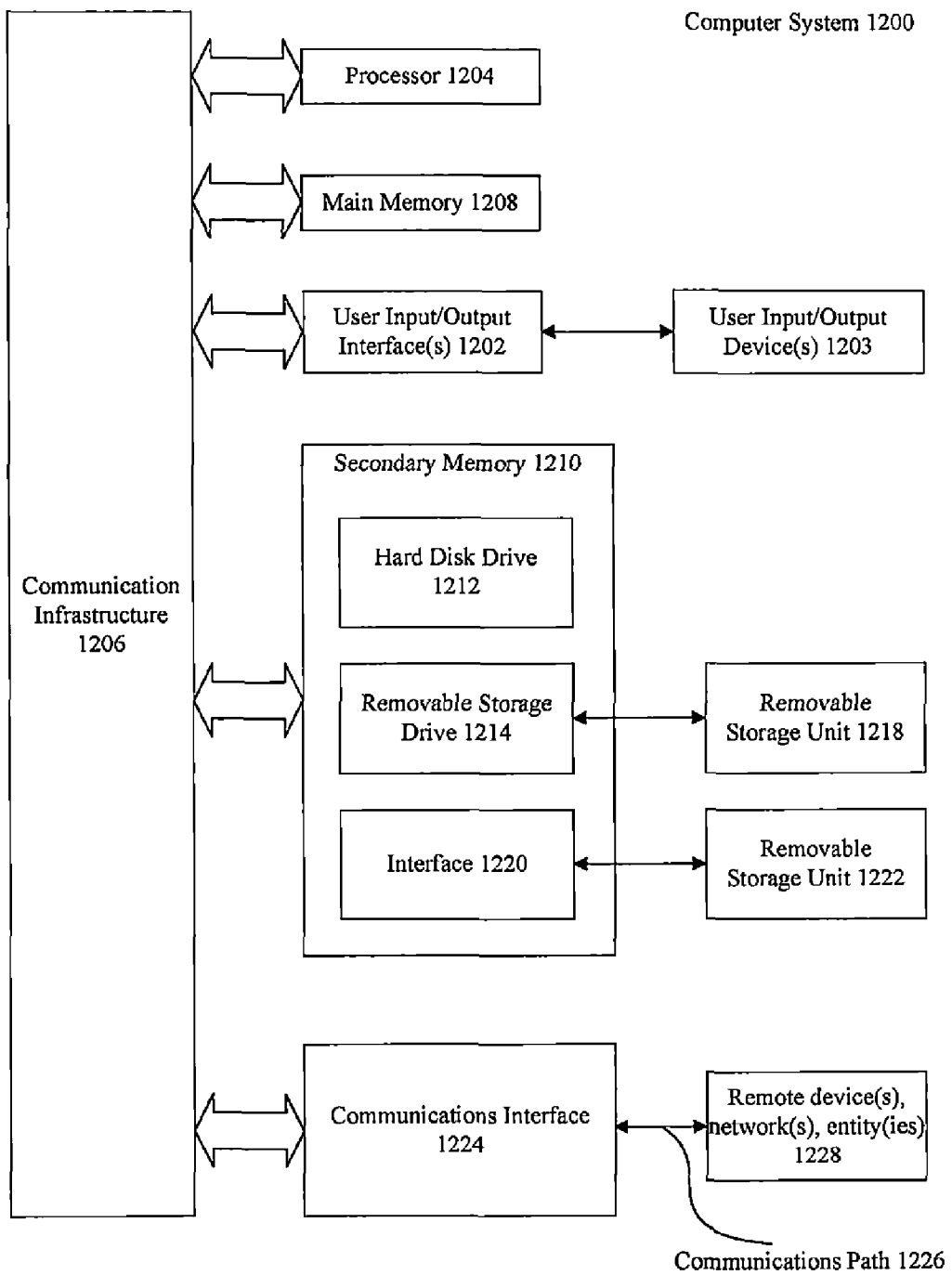
FIG. 12 is an example computer system useful for implementing some embodiments or portion(s) thereof.

Various embodiments can be implemented, for example, using one or more computer systems, such as computer system 1200 shown in FIG. 12. Computer system 1200 can be any well-known computer capable of performing the functions described herein. For example, and without limitation, electronic devices 110, 140, 150, (and/or other apparatuses and/or components shown in the figures) such as 230 and the flowchart of FIG. 3, may be implemented using one or more computer systems 1200, or portions thereof.

Computer system 1200 includes one or more processors (also called central processing units, or CPUs), such as a processor 1204. Processor 1204 is connected to a communication infrastructure or bus 1206. Computer system 1200 also includes user input/output device(s) 1203, such as monitors, keyboards, pointing devices, etc., that communicate with communication infrastructure 1206 through user input/output interface(s) 1202. Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

The operations in the preceding embodiments can be implemented in a wide variety of configurations and architectures. Therefore, some or all of the operations in the preceding embodiments may be performed in hardware, in software or both. In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 125, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 12. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A system for weighted gradient-based adaptive peak cancellation, comprising:
    a memory; and
    a processor communicatively coupled to the memory, configured to:
        receive an Orthogonal Frequency Division Multiplexing (OFDM) symbol;
        determine a clipping noise sample based at least in part on the OFDM symbol;
        determine a peak cancellation signal comprising a weighted peak reduction tone (PRT), wherein the weighted PRT is based at least in part on a power spectral density of the clipping noise sample and a power-limitation specific to the weighted PRT, and wherein the peak cancellation signal is used to reduce a peak-to-average power ratio (PAPR) of the OFDM symbol; and
        determine a next peak cancellation signal for a subsequent OFDM symbol, based at least in part on the peak cancellation signal.

2. The system of claim 1, wherein to determine the peak cancellation signal, the processor is configured to:
    cyclically shift the weighted PRT to a location of the clipping noise sample; and
    scale the weighted PRT by the power spectral density of the clipping noise sample and the power-limitation specific to the weighted PRT.

3. The system of claim 2, wherein, the processor is configured to preserve a phase of the clipping noise sample.

4. The system of claim 1, wherein the power-limitation specific to the weighted PRT is based at least in part on an in-band power constraint or an out-of-band power constraint.

5. The system of claim 4, wherein the out-of-band power constraint comprises a spectral mask, and the in-band power constraint comprises an error vector magnitude (EVM).

6. The system of claim 4, wherein the power-limitation specific to the weighted PRT further comprises an available power resource associated with the in-band power constraint or the out-of-band power constraint.

7. The system of claim 1, wherein the processor is further configured to:
    constrain the power-limitation specific to the weighted PRT to a settable maximum power.

8. The system of claim 1, wherein the processor is further configured to:
    determine that the weighted PRT is a data-carrying sub-carrier; and
    apply a directional constraint to the weighted PRT to reduce an error rate.

9. The system of claim 8, wherein the directional constraint applied maintains a separation of at least a target distance between a constellation point associated with the clipping noise sample and another constellation point.

10. The system of claim 8, wherein the error rate comprises a packet error rate (PER) or a bit error rate (BER).

11. The system of claim 1, wherein the power-limitation specific to the weighted PRT is different than a power-limitation specific to a second PRT of the peak cancellation signal.

12. A method for weighted gradient-based adaptive peak cancellation, comprising:
    receiving an Orthogonal Frequency Division Multiplexing (OFDM) symbol;
    determining a clipping noise sample based at least in part on the OFDM symbol;
    determining a peak cancellation signal comprising a weighted peak reduction tone (PRT), wherein the weighted PRT is based at least in part on a power spectral density of the clipping noise sample and a power-limitation specific to the weighted PRT, and wherein the peak cancellation signal is used to reduce a peak-to-average power ratio (PAPR) of the OFDM symbol; and
    constraining the power-limitation specific to the weighted PRT to a settable maximum power.

13. The method of claim 12, further comprising determining a next peak cancellation for a subsequent OFDM symbol, based at least in part on the peak cancellation signal.

14. The method of claim 12, wherein determining the peak cancellation signal comprises:
    cyclically shifting the weighted PRT to a location of the clipping noise sample; and
    scaling the weighted PRT by the power spectral density of the clipping noise sample and the power-limitation specific to the weighted PRT.

15. The method of claim 12, wherein the power-limitation specific to the weighted PRT is based at least in part on an in-band power constraint or an out-of-band power constraint.

16. The method of claim 15, wherein the power-limitation specific to the weighted PRT further comprises an available power resource associated with the in-band power constraint or the out-of-band power constraint.

17. The method of claim 12, wherein the power-limitation specific to the weighted PRT is different than a power-limitation specific to a second PRT of the peak cancellation signal.

18. A non-transitory computer-readable medium having instructions stored therein, which when executed by a processor, cause the processor to perform operations, the operations comprising:
    receiving an Orthogonal Frequency Division Multiplexing (OFDM) symbol;
    determining a clipping noise sample based at least in part on the OFDM symbol; and
    determining a peak cancellation signal comprising a weighted peak reduction tone (PRT), wherein weighted PRT is based at least in part on a power spectral density of the clipping noise sample and a power-limitation specific to the weighted PRT, and wherein the peak cancellation signal is used to reduce a peak-to-average power ratio (PAPR) of the OFDM symbol.

19. The non-transitory computer-readable medium of claim 18, wherein the power-limitation specific to the weighted PRT is different than a power-limitation specific to a second PRT of the peak cancellation signal.

20. The non-transitory computer-readable medium of claim 18, wherein the power-limitation specific to the weighted PRT further comprises an available power resource associated with an in-band power constraint or an out-of-band power constraint.

* * * * *